May 19, 1931. C. F. RUBSAM 1,805,844
VAPORIZER
Filed June 14, 1929

Inventor:
Charles F. Rubsam
By Fred Gerlach
his Atty.

Patented May 19, 1931

1,805,844

UNITED STATES PATENT OFFICE

CHARLES F. RUBSAM, OF JACKSON, MICHIGAN

VAPORIZER

Application filed June 14, 1929. Serial No. 370,807.

The present invention relates generally to vaporizing devices. More particularly the inventor relates to that type of device which is adapted to be placed on an ordinary vessel containing hot water and embodies a pocket in the central portion thereof for a chemical.

One object of the invention is to provide a vaporizing device of this type which is generally of new and improved construction and comprises a bowl which is adapted to rest loosely on the rim of the vessel and has upwardly extending openings in the central or bottom part thereof for directing steam from the vessel around the chemical-retaining pocket and into the interior of the bowl.

Other objects of the invention and the various advantages and characteristics of the present vaporizer construction, will be apparent from a consideration of the following detailed description.

The invention consists in the several novel features which are hereinafter set forth and are more particularly described by claims at the conclusion hereof.

Figure 1:
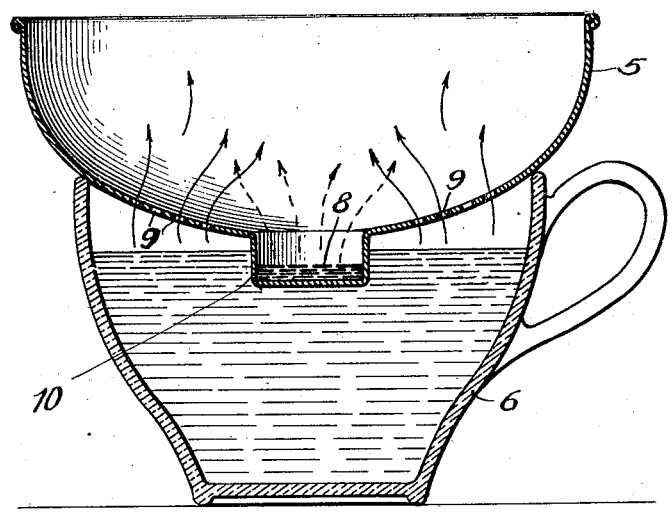
Figure 2:
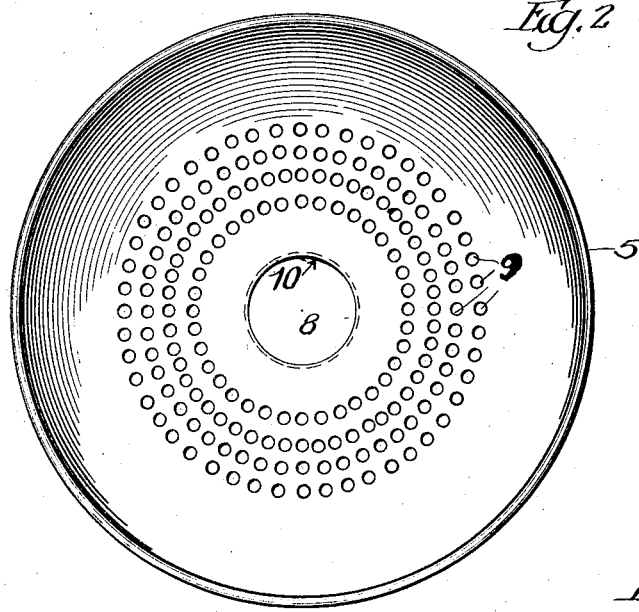

In the drawings which accompany and form a part of this specification or disclosure and in which like numerals of reference denote corresponding parts throughout the views; Fig. 1 is a vertical section of a vaporizing device embodying the invention. Fig. 2 is a plan view.

The vaporizing device which forms the subject matter of the invention comprises a bowl 5 of sheet metal. The bowl is concavo convex in conformation, and is adapted to rest on an ordinary vessel, such as a cup 6 containing hot water. The bottom of the bowl is depressed to form a downwardly extending pocket 10. The latter serves to retain a chemical 8 which is adapted to be vaporized by heat and may be in liquid, powder, or crystal form. The bowl is extended outwardly beyond the rim of the cup 6, and has formed therein between the rim-engaging portion and pocket 10 a series of openings 9. The upper end of the bowl is open for the escape of the vapor. By forming the pocket 10 in the lower portion of the bowl, it will extend into the cup sufficiently to be submerged in the hot water in the cup 6, so it will be heated thereby. The steam from the water in the cup will rise through the openings 9 and pass upwardly into the bowl and be mixed with the vapor produced by the heated chemical.

In using the device, the pocket 10 is first filled with the desired chemical and then the bowl is placed upon the rim of the cup. Thereafter, the user holds his or her head over the bowl 5 and inhales the vapor emanating from and around the pocket.

The vaporizing device herein disclosed is exceedingly simple as far as construction is concerned and is capable of being set on vessels that vary in diameter by virtue of the fact that it comprises a bowl. Inasmuch as the bowl and pocket are made from a single piece of sheet metal, the cost of producing the device is reduced to a minimum. A characteristic and an advantage of utilizing a concavo convex bowl is that the rim of the cup is effectively sealed against leakage of steam.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A vaporizing device of the character described, comprising a member adapted to set on the top of an ordinary vessel containing hot water, and provided at the central portion thereof with a depending pocket for holding a chemical, the margin of the member being extended and adapted to rest loosely on the rim of the vessel, the portion of the member between the margin and the pocket having holes formed therein for directing steam from the vessel upwardly through the member and around the pocket.

2. A vaporizing device of the character described, comprising a bowl adapted to set on the top of an ordinary vessel containing hot water, and provided at the central or bottom portion thereof with a depending pocket for holding a chemical, the margin of the bowl being adapted to rest loosely on the rim of the vessel and extending outwardly and upwardly from the rim-engaging part to form an enlarged chamber with an open top, the portion of the bowl between said rim-engaging part and the pocket being substantially flat and having a plurality of holes formed therein for directing steam from the vessel upwardly around the pocket and into the chamber.

3. A vaporizing device of the character described, comprising a one-piece sheet metal bowl adapted to set on the top of an ordinary vessel containing hot water, and having an integral depending chemical-holding pocket pressed in the central or bottom portion thereof, the margin of the member being adapted to rest loosely on the rim of the vessel and extending outwardly and upwardly from the rim-engaging part to form an enlarged chamber with an open top, the portion of the bowl between said rim-engaging part and the pocket being substantially flat and having a plurality of holes formed therein for directing steam from the vessel upwardly around the pocket and into the chamber.

Signed at Jackson, Michigan, this 11th day of May, 1929.

CHARLES F. RUBSAM.